(12) United States Patent
Yoneyama et al.

(10) Patent No.: US 6,659,511 B2
(45) Date of Patent: Dec. 9, 2003

(54) FLEXIBLE FLUID-TRANSPORT PIPE JOINT APPARATUS

(75) Inventors: Hideki Yoneyama, Sanda (JP); Akihito Totsugi, Sanda (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 0 days.

(21) Appl. No.: 09/810,594

(22) Filed: Mar. 16, 2001

(65) Prior Publication Data

US 2001/0024037 A1 Sep. 27, 2001

(30) Foreign Application Priority Data

Mar. 22, 2000 (JP) .......................... 2000-080033

(51) Int. Cl.$^7$ .......................... F16L 17/00; F16L 19/00; F16L 33/18
(52) U.S. Cl. ...................... 285/360; 285/302; 285/363; 285/376; 285/913; 285/401
(58) Field of Search ................................. 285/401, 337, 285/913, 231, 302, 374, 376, 360, 362, 363, 368; F16L 27/00

(56) References Cited

U.S. PATENT DOCUMENTS

| | | | |
|---|---|---|---|
| 2,922,667 A | | 1/1960 | Lanciano, Jr. |
| 3,131,642 A | * | 5/1964 | Geer et al. .................. 285/302 |
| 4,280,723 A | * | 7/1981 | Moldestad .................. 285/376 |
| 4,610,471 A | * | 9/1986 | Halen et al. ............ 285/148.13 |
| 5,116,085 A | * | 5/1992 | Carrel ......................... 277/634 |
| 5,421,621 A | * | 6/1995 | Schaefer ...................... 285/11 |
| 6,244,632 B1 | * | 6/2001 | Gasparini ................... 285/330 |

FOREIGN PATENT DOCUMENTS

| | | |
|---|---|---|
| JP | 09264473 | 7/1997 |
| JP | 09292074 | 11/1997 |
| JP | 11264491 | 9/1999 |

* cited by examiner

Primary Examiner—Lynne H. Browne
Assistant Examiner—Aaron M Dunwoody
(74) Attorney, Agent, or Firm—Webb Ziesenheim Logsdon Orkin & Hanson, P.C.

(57) ABSTRACT

A flexible pipe joint apparatus for use in a fluid (e.g., water) transport pipe system for maximally absorbing an external force such as a compression or tensile force applied to a pipe of the fluid transport system due to an earthquake, differential settlement, thermal expansion or contraction of the pipe per se, thus preventing resultant damage at a weak portion of the pipe. The apparatus includes a receiving tubular member and an inserting tubular member insertable into and connectable with the receiving tubular member along a tube axial direction. A stopper portion is formed in an outer peripheral face of the inserting tubular member, the stopper portion projecting radially outward from the outer peripheral face. A retaining portion is formed in an inner peripheral face of the receiving tubular member, the retaining portion coming into contact with the stopper portion of the inserting tubular member so as to prevent slidable displacement between the two tubular members at least on a withdrawal side in a predetermined relative slidable range of the tubular members. The stopper portion includes a plurality of projections formed at a plurality of positions along a periphery of the inserting tubular member. The retaining portion of the receiving tubular member includes a plurality of detaching recesses, each said recess allowing passage of each of the projections axially relative to the detaching recess only when the receiving tubular member and the inserting tubular member are located in a predetermined phase relationship with each other.

7 Claims, 8 Drawing Sheets

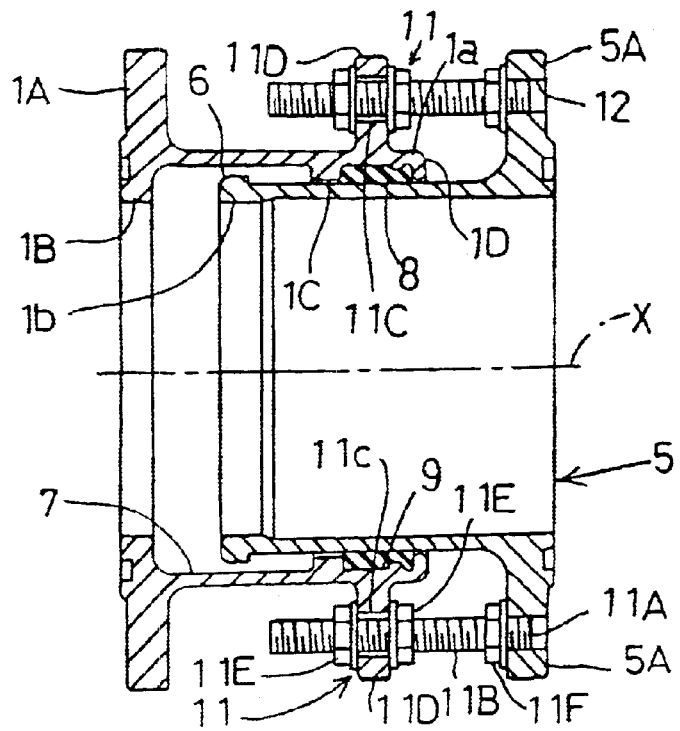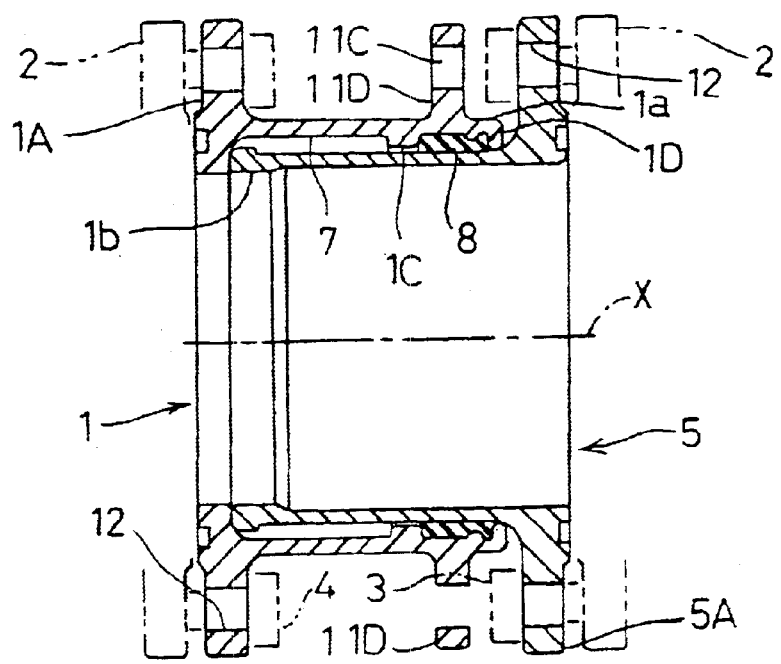

SHIPMENT CONDITION

5° rotation

10° rotation

15° rotation

20° rotation

25° rotation

30° rotation

Prior Art

FLEXIBLE FLUID-TRANSPORT PIPE JOINT APPARATUS

BACKGROUND OF THE INVENTION

1. Field of the Invention

The present invention relates to a flexible pipe joint apparatus for use in a fluid (e.g., water) transport pipe system for maximally absorbing an external force such as a compression or tensile force applied to a pipe of the fluid transport system due to an earthquake, differential settlement, thermal expansion or contraction of the pipe per se, thus preventing resultant damage at a weak portion of the pipe. The invention more particularly relates to a flexible pipe joint apparatus of the above-noted type which includes a receiving tubular member, an inserting tubular member insertable into and connectable with the receiving tubular member along a tube axial direction, a stopper portion formed on an outer peripheral face of the inserting tubular member, the stopper portion projecting radially outward from the outer peripheral face, and a retaining portion formed in an inner peripheral face of the receiving tubular member, the retaining portion coming into contact with the stopper portion of the inserting tubular member so as to prevent relative slidable displacement between the two tubular members at least on a withdrawal side beyond a predetermined relative axially slidable range of the tubular members.

2. Description of the Related Art

A conventional flexible fluid-transport pipe joint apparatus is shown in FIG. 13. As shown, this apparatus includes a receiving tubular member 1 having a connecting flange 1A for connection to a fluid transport device such as a sluice valve, a fluid transport pipe, etc. and an inserting tubular member 5 insertable into the receiving tubular member 1 and having a connecting flange 5A for connection to the fluid transport pipe such as a transport pipe. In the inner peripheral face of the receiving tubular member 1, there are formed a first annular groove 7 for restricting a relatively slidable range between the two tubular members 1, 5 and also a second annular groove 9 for fitting therein an elastic seal 8 in order to seal the gap formed between the inner peripheral face of the receiving tubular member 1 and the outer peripheral face of the inserting tubular member 5. Adjacent the axial end of the outer peripheral face of the inserting tubular member 5, there are formed a third annular groove 51 for fitting therein a substantially C-shaped retaining ring 50 elastically deformable for radial expansion to act as a 'stopper portion' and a tapered guide face 52 for guiding the retaining ring 50 into the third annular groove 51 while allowing radial elastic expansion of this ring 50. The first annular groove 7 is formed by and between a wall portion 1B on the base-end side and a further wall portion 1C on the opening side of the inner peripheral face of the receiving tubular member 1. These wall portions 1B and 1C together constitute a 'retaining portion' for coming into abutment against the retaining ring 50 fitted in the third annular groove 51 of the inserting tubular member 5 and also with a leading end face of this inserting tubular member 5 along the tube axial direction X, thereby to limit relative slidable displacement between the two tubular members 1, 5 on the withdrawal (pulling) side and on the inserting (pushing) side, respectively, within a certain tolerance.

With such conventional fluid-transport flexible pipe joint apparatus, when the receiving tubular member 1 and the inserting tubular member 5 are to be connected with each other, the inserting tubular member 5 cannot be inserted into and connected with the receiving tubular member 1, with the retaining ring 50 being kept fitted within the third annular groove 51 of the inserting tubular member 5. Then, as illustrated in FIGS. 14 and 15, prior to the connecting operation of the tubular members 1, 5, it is necessary first to attach a first fitting jig 53 and a second fitting jig 54 within the receiving tubular member 1. The first fitting jig 53 is capable of receiving the retaining ring 50 inserted into the receiving tubular member and can be disassembled into a plurality of sections in the peripheral direction. Like the first fitting jig 53, the second fitting jig 54 also can be disassembled into a plurality of sections in the peripheral direction. And, this second fitting jig 54 includes an annular receiving face 54a for retaining the retaining ring 50 from the radially inside thereof coaxially with the receiving tubular member 1 and a tapered cam face 54b for radially expanding and shifting the retaining ring 50 received by the first fitting jig 53 to the tapered guide face 52 of the inserting tubular member 5 as the face 54b comes into contact with the leading end of the inserting tubular member 1 and is subsequently moved therewith during the insertion of the tubular member 1. After completion of the connecting operation of the two tubular members 1, 5, it is necessary to disassemble and remove the first and second fitting jigs 53, 54 set inside the receiving tubular member 1 one after another. In this manner, the connecting operation of the two tubular members 1, 5 is very troublesome.

Moreover, the entire fluid transport flexible pipe joint apparatus requires the retaining ring 50 in addition to the two tubular members 1, 5; and the fitting grooves therefor need to be formed with high machining precision in the inserting tubular member 5. Hence, high manufacture costs tend to ensue due to the great number of the parts and the great number of the manufacturing steps as well.

The present invention has addressed the above-described state. A primary object of the invention is to provide a flexible pipe joint apparatus for fluid transport, which apparatus allows the connecting operation of the receiving tubular member and the inserting tubular member to be effected efficiently and easily without using any special jigs and which also achieves reduction in the manufacturing costs of the apparatus.

SUMMARY OF THE INVENTION

For accomplishing the above-noted object, according to the present invention, a flexible fluid-transport pipe joint apparatus includes a receiving tubular member, an inserting tubular member insertable into and connectable with the receiving tubular member along a tube axial direction, the apparatus comprising:

a stopper portion formed in an outer peripheral face of the inserting tubular member, the stopper portion projecting radially outward from the outer peripheral face; and a retaining portion formed in an inner peripheral face of the receiving tubular member, the retaining portion coming into contact with the stopper portion of the inserting tubular member so as to prevent slidable displacement between the two tubular members at least on a withdrawal side in a predetermined relative slidable range of the tubular members;

wherein the stopper portion includes a plurality of projections formed at a plurality of positions along a periphery of the inserting tubular member; and the retaining portion of the receiving tubular member includes a plurality of detaching recesses, each said recess allowing passage of each of the projections axially relative to the detaching recess only when the receiving tubular member and the inserting tubular member are located in a predetermined phase relationship with each other.

Here, the term "phase" means a relative rotational relationship between the two tubular members about the tube axis.

According to the above-described construction proposed by the invention, for connecting the receiving tubular member and the inserting tubular member with each other, the two tubular members are first adjusted in the peripheral direction into a predetermined phase relationship (i.e. a predetermined connecting position) with each other so as to bring the projections and the detaching recesses into agreement. Under this condition, the tubular members are then moved axially closer or deeper to each other for allowing each recess to pass each projection. Thereafter, the two tubular members are peripherally rotated relative to each other from the predetermined connecting position to a predetermined retained position.

With the realization of the retained position above, when a mutually withdrawing, i.e. separating force is applied to the tubular members, withdrawal of one tubular member from the other tubular member may be effectively resisted as all or some of the projections of the inserting tubular member come into abutment against the retaining portion of the receiving tubular member along the axial direction of the tubular members.

As described above, with the construction of the present invention, the connecting operation of the receiving tubular member and the inserting tubular member requires only two steps, i.e., the step of axially engaging the tubular members relative to each other under the predetermined phase condition and the second step of rotating these tubular members relative to each other under this condition. Hence, this construction eliminates the troublesome operation of assembling and disassembling the jigs within the limited space inside the receiving tubular member, so that the connecting operation of the two tubular members can be effected easily and efficiently.

Moreover, the precision required for forming the projections on the inserting tubular member and the detaching recesses in the receiving tubular member may be only such as to allow mutual passage therebetween under the predetermined phase relationship. Hence, any special high-precision machining of these projections and recesses is not needed. Also, the number of parts can be reduced, compared with the conventional construction described above.

According to one preferred embodiment of the present invention, the flexible pipe joint apparatus further comprises a temporarily fixing means for temporally fixing the receiver and inserting tubular members to be non-rotatable relative to each other when the tubular members are under a retained condition which is realized by rotating the inter-connected receiving and inserting tubular members relative to each other from said predetermined phase relationship.

With the above-described construction, when during e.g., shipment of the apparatus to a site of installment and various external forces are applied inadvertently to the receiving tubular member and the inserting tubular member connected with each other, the retaining portion (i.e., detaching recesses) of the receiving tubular member and the stopper portion (i.e., the projections) of the inserting tubular member may be maintained with a predetermined peripheral depth of engagement with each other sufficient to resist the effect of the external forces. Further, when the receiving tubular member and the inserting tubular member are to be flange-connected with various fluid transport devices such as a sluice valve, fluid transport pipe by releasing the temporary fixing means, it becomes necessary to slightly rotate the receiving tubular member and the inserting tubular member for their mutual phase alignment. In such case, the above-described construction can effectively prevent occurrence of accidental peripheral or rotational agreement between the projections of the inserting tubular member and the detaching recesses of the receiving tubular member.

Therefore, the above construction assures reliable and firm non-withdrawable connection between the two tubular members while facilitating handling of the apparatus during its shipment to a user or to a site of installment.

Preferably, the flexible fluid-transport pipe joint apparatus further comprises a covering means extending over a connecting portion between the outer peripheral face of the receiving tubular member and the outer peripheral face of the inserting tubular member so as to cover the detaching recesses from the above.

With the above construction, while the apparatus retains the effect of allowing efficient and facilitated connecting operation between the two tubular members due to the formation of the detaching recesses which allow axial passage of the respective projections of the inserting tubular member only when the two tubular members are under the predetermined phase relationship, the covering means covers or protects the detaching recesses, so that an elastic seal or the like to be interposed between the inner peripheral face of the receiving tubular member and the outer peripheral face of the inserting tubular portion may be effectively prevented from being exposed to the ambient air or the like. Consequently, weatherability of such interposing element as the elastic seal may be improved advantageously.

Still preferably, the plurality of projections and the plurality of detaching recesses are arranged in symmetry with respect to a diametrical center line extending through the common axis of the tubular members and the plurality of detaching recesses are peripherally distributed such that the peripherally adjacent pairs of the detaching recesses form center angles relative to the tube axis which angles are different from one another.

With the above construction, when the receiving tubular member and the inserting tubular member are to be connected with each other, the predetermined phase relationship characterized by the positional agreement between the projections of the inserting tubular member together forming the stopper portion and the detaching recesses of the receiving tubular member together forming the retaining portion is realized only one time during the total rotation (360 degrees).

Therefore, the two tubular members can be rotated relative to each other by the maximum angle of rotation of 180 degrees from the predetermined phase condition (i.e., the connecting position) where the projections of the inserting tubular member and the detaching recesses of the receiving tubular member are in peripheral alignment with each other to the predetermined retained position. Hence, when the receiving tubular member or the inserting tubular member is to be flange-connected with a fluid transport device such as a sluice valve, fluid transport pipe or the like by releasing the temporary fixing means and the receiving tubular member and the inserting tubular member are to be slightly rotated relative to each other for mutual alignment, it is possible to ensure sufficient engagement peripheral depth between the retaining portion of the receiving tubular member and the projections of the inserting tubular member. Consequently, the two tubular members may be connected reliably and firmly while effectively preventing inadvertent withdrawal of one from the other.

Yet, as the projections and the detaching recesses are formed in symmetry with each other relative to the diametrical center line extending through the common axis of the tubular members, it is easy for a user to visually find the predetermined phase relationship. So that, the phase adjustment between the inserting tubular member and the receiving tubular member may be effected easily.

Still preferably, the inserting tubular member includes, on an inner peripheral face and at portions corresponding to the projections formed on the outer peripheral face thereof, a plurality of projections which project radially inward.

With the above construction, while the apparatus retains the effect of allowing efficient and facilitated connecting operation between the two tubular members due to the formation of the detaching recesses which allow axial passage of the respective projections of the inserting tubular member only when the two tubular members are under the predetermined phase relationship, the inner peripheral face portions of the inserting tubular member may be reinforced because of the presence of inward projections, so that inadvertent withdrawal displacement between the two tubular members can be resisted more effectively and reliably.

Still preferably, the temporary fixing means is detachably attached to a connecting flange of the inserting tubular member and also to a plurality of projecting connecting portions formed at a plurality of peripheral positions in the outer peripheral face of the receiving tubular member adjacent a receiver opening thereof, and an attaching portion for the covering means is formed in the outer peripheral face of the receiving tubular member and between an end face of the receiving tubular member adjacent the receiver opening thereof and said connecting portions.

With the above construction, by forming the connecting portions on the receiver-opening side portion of the outer peripheral face of the receiving tubular member adjacent the connecting flange of the inserting tubular member, the temporary fixing means may be formed compact with respect to the axial direction of the tubular members. In addition, by utilizing the axial gab between the receiver-opening side end face and the connecting portions as the attaching portion for the covering means, this covering means may be attached readily and speedily.

Further and other features and advantages of the present invention will become apparent from the following detailed disclosure of the preferred embodiments thereof with reference to the accompanying drawings.

BRIEF DESCRIPTION OF THE DRAWINGS

FIG. 1 is a side view in vertical section showing a first embodiment of a flexible fluid-transport pipe joint apparatus relating to the present invention, FIG. 2 is a side view in vertical section illustrating a condition of the apparatus when a tensile force is applied thereto.

DESCRIPTION OF THE PREFERRED EMBODIMENTS

Figure 3:
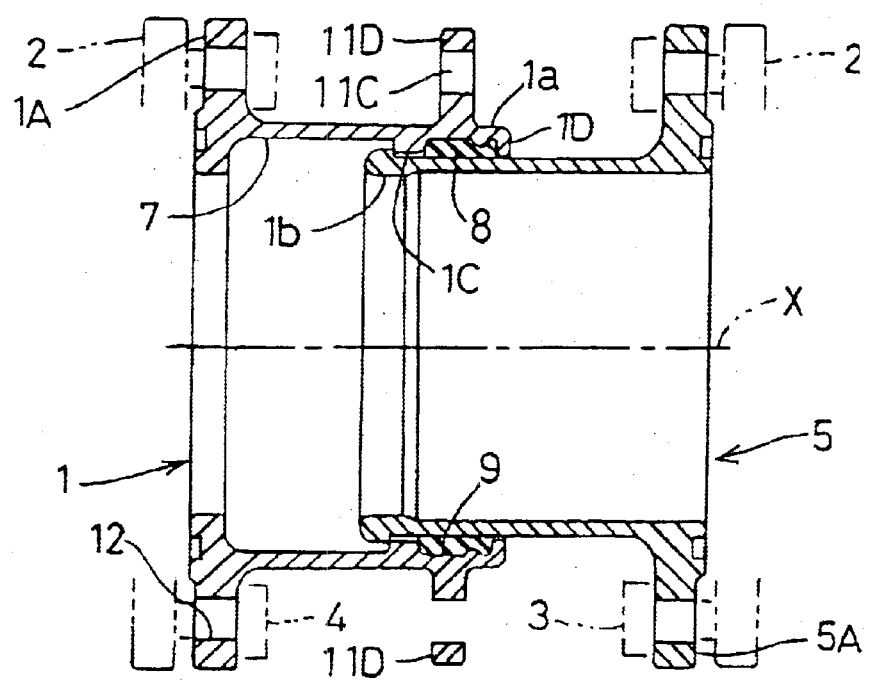
FIG. 3 is a side view in vertical section illustrating a further condition of the apparatus when a compressive force is applied thereto.
Figure 4:
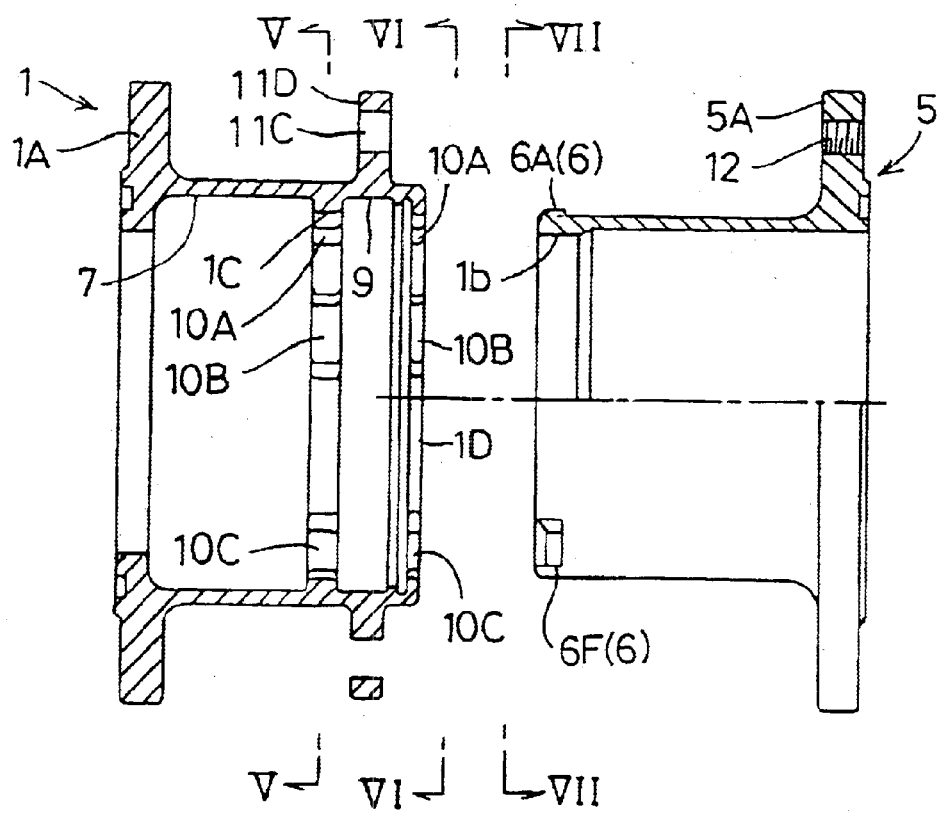
FIG. 4 is a side view in vertical section showing a receiving tubular member and an inserting tubular member of the apparatus are disassembled from each other.

FIGS. 1–11 show a flexible pipe joint apparatus to be connected to an intermediate portion of a fluid transport pipe P such as a water pipe disposed inside a work bit WP. This flexible pipe joint apparatus includes a receiving tubular member 1 made of cast iron which integrally forms, at a base end thereof, a connecting flange 1A fixedly connectable to a connecting flange 2 of a fluid transport device such as a sluice valve V, the fluid transport pipe P or the like along a tube axial direction (tube axis) X via fastener means such as bolts 3 and nuts 4. The apparatus also includes an inserting tubular member 5 made of cast iron which is removably insertable into the receiver opening of the receiving tubular member 1 along the tube axial direction X. This inserting tubular member 5 too integrally forms, at a base end thereof, a connecting flange 5A fixedly connectable to the connecting flange 2 of the fluid transport device along the tube axial direction (tube axis) X via fastener means such as the bolts 3 and nuts 4.

As shown in FIGS. 1–4, a radially projecting stopper portion 6 is provided at the leading end of an outer peripheral face of the inserting tubular member 5. In an inner peripheral face of the receiving tubular member 1, there are defined a first annular groove 7 for defining, by contact, a predetermined relative slidable range (range of flexion) between the inter-connected two tubular members 1, 5 along the tube axial direction X, and a second annular groove 9 within which an elastic seal 8 for sealing the gap formed between the inner peripheral face of the receiving tubular member 1 and the outer peripheral face of the inserting tubular member 5 is fitted. Further, the inner peripheral face of the receiving tubular member 1 includes an annular circular wall portion 1B on the side of the base end and an annular circular wall portion 1C on the side of the receiver opening, the two wall portions 1B, 1C together forming the first annular groove 7 therebetween. The wall portions 1B, 1C together constitute a 'retaining portion' which comes into abutment against the stopper portion 6 of the inserting tubular member 5 and the leading end face of the inserting tubular member 5 along the tube axial direction X, thereby limiting slidable relative displacement between the two tubular members 1, 5 along the tube axial direction X on the pulling (withdrawing) side and on the pushing (compressing) side, respectively within said predetermined relative slidable range.

Figure 5:
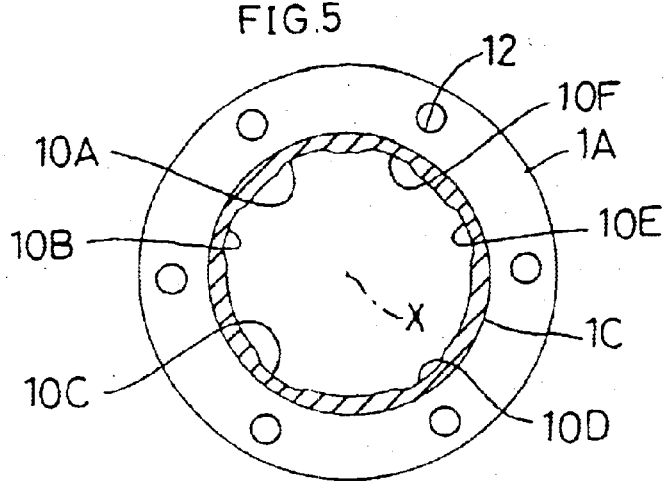
FIG. 5 is a section view taken along a line V—V in FIG. 4.
Figure 6:
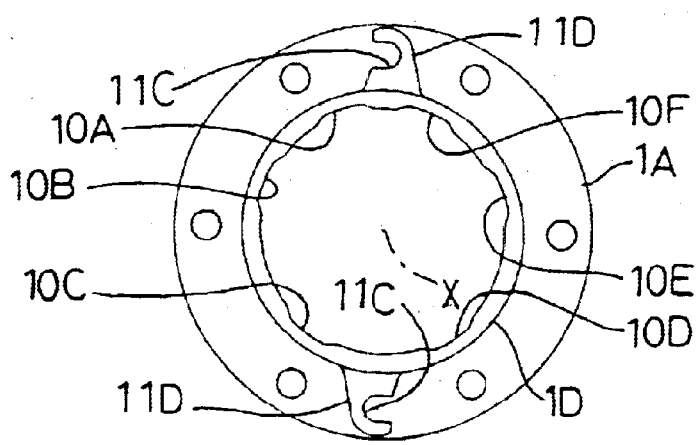
FIG. 6 is an end view taken along a line VI—VI in FIG. 4.
Figure 7:
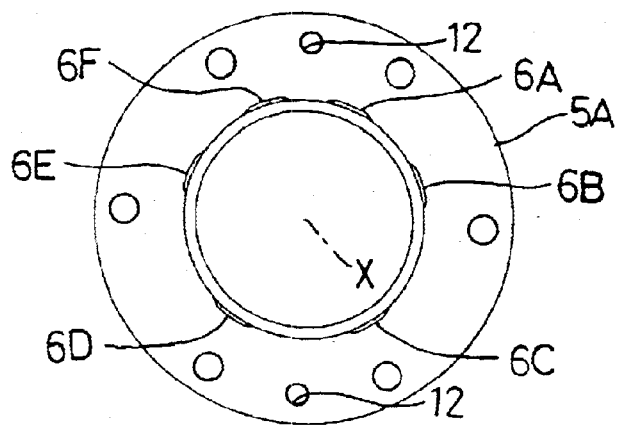
FIG. 7 is an end view taken along a line VII—VII in FIG. 4.

As shown in FIGS. 5–7, the stopper portion 6 consists essentially of a plurality of projections 6A–6F formed at plural (six in the illustrated embodiment) peripheral portions of the inserting tubular member 5. Further, the one retaining portion, i.e., annular circular wall portion 1C on the side of the receiver opening of the receiving tubular member 1 and the annular circular wall portion 1D extending continuously with the receiver-side end face of the tubular member 1, in other words, the annular circular wall portions 1C, 1D together defining the second annular groove 9 for fitting the elastic seal 8 therein include a plurality of detaching recesses 10A–10F for allowing passage of the respective projections 6A–6F along the tube axial direction X only when the two tubular members 1, 5 are located in a predetermined rotational phase relationship relative to the tube axis. Further, a temporary fixing means 11 is provided for temporarily fixing the two tubular members 1, 5 against their relative rotational and relative axial slidable displacements in a retained condition which is realized when the receiving tubular member 1 and the inserting tubular member 5 connected with each other under said predetermined phase relationship is subsequently rotated by a predetermined angle from the connected position to a predetermined retained position.

Figure 8:
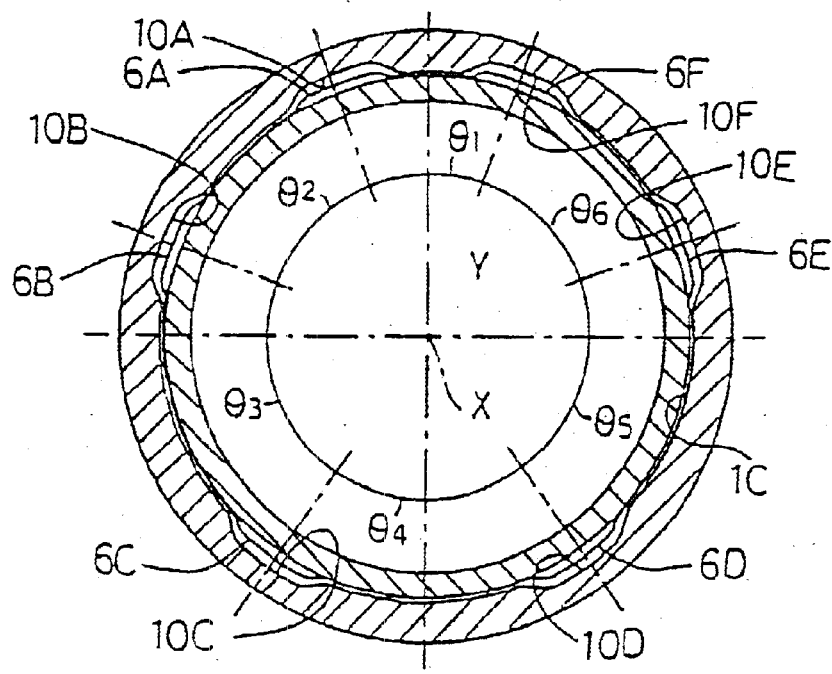
FIG. 8 is a front view in section showing, in an enlarged scale, the receiving tubular member and the inserting tubular member engaged and connected with each other.
Figure 9:
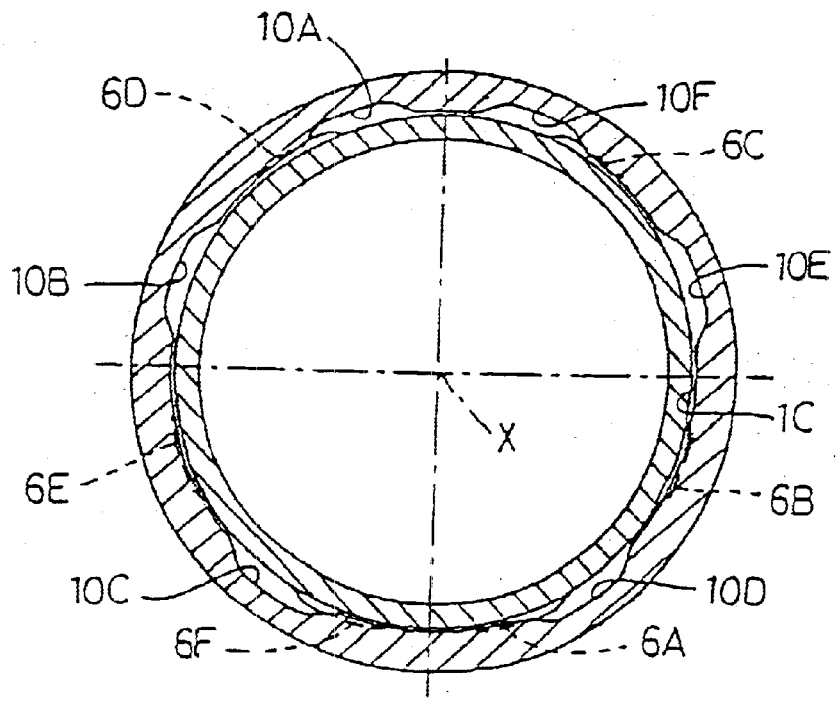
FIG. 9 is a front view in section showing, in an enlarged scale, a shipment condition in which the two interconnected tubular members are rotated by 180 degrees relative to each other.

As shown in FIGS. 8 and 9, the projections 6A–6F and the detaching recesses 10A–10F are arranged in symmetry relative to a diametrical center line Y extending through the common tube axis X; and the detaching recesses 10A–10F are peripherally distributed in such a manner that peripherally adjacent pairs of the detaching recesses form center angles relative to the tube axis X which angles are different from each other.

Specifically, in this first embodiment, the center angle θ1 is 40 degrees, angles θ2 and θ6 are 50 degrees, θ3 and θ5 are 75 degrees, and θ4 is 70 degrees, respectively.

FIG. 8 illustrates a condition when the plurality of projections 6A–6F of the inserting tubular member 5 and the plurality of detaching recesses 10A–10F are in registry or agreement with each other in the predetermined phase relationship. FIG. 9 shows the further condition (predetermined retained position) suitable for shipment of the apparatus, in which the two tubular members 1, 5 have been rotated by 180 degrees relative to each other from the predetermined phase (connecting condition) to the predetermined retained condition, and under this condition, the tubular members 1, 5 are temporarily fixed against relative rotational and slidable displacements thereof by the temporary fixing means 11.

Figure 10A:
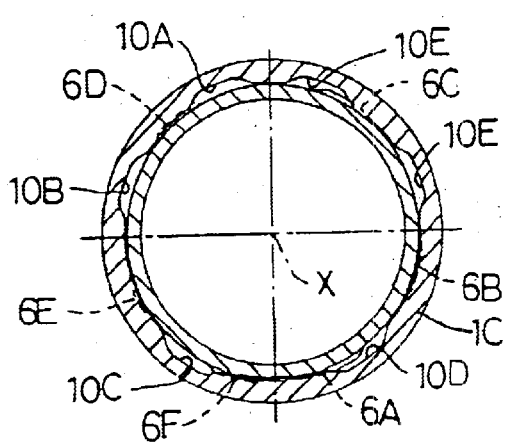
FIG. 10A is a front view in section showing a further condition in which the two interconnected tubular members are shifted by 5 degrees from the shipment condition shown in FIG. 9.

FIG. 10A shows a further condition in which the receiving tubular member 1 and the inserting tubular member 5 have been rotated by 5 degrees from the predetermined retained position described above. This condition or the rotational operation therefor is utilized when the flexible pipe joint apparatus shipped to the installment site is to be flange-connected with the fluid transport device by registering positions of bolt holes 12 between the connecting flange 2 of the receiving tubular member 1 and the connecting flange 1A and also positions of bolt holes 12 between the connecting flange 2 of the fluid transport pipe and the connecting flange 5A of the inserting tubular member 5.

Figure 10B:
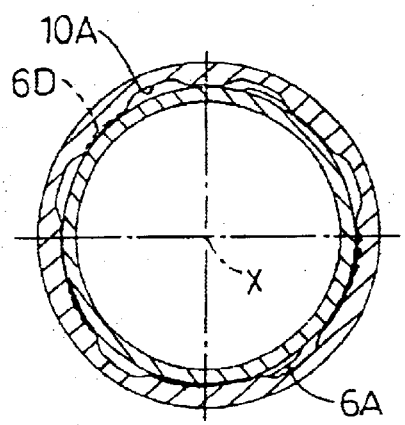
FIG. 10B is a front view in section showing a still further condition in which the two interconnected tubular members are shifted by 10 degrees from the shipment condition shown in FIG. 9.
Figure 10C:
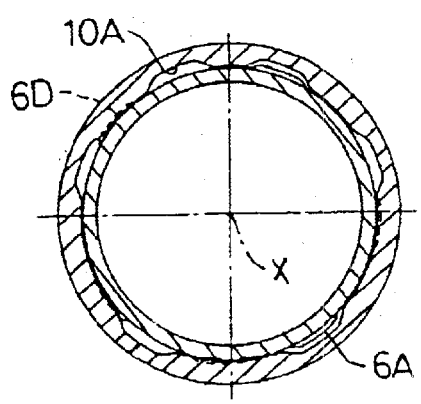
FIG. 10C is a front view in section showing a still further condition in which the two interconnected tubular members are shifted by 15 degrees from the shipment condition shown in FIG. 9.
Figure 10D:
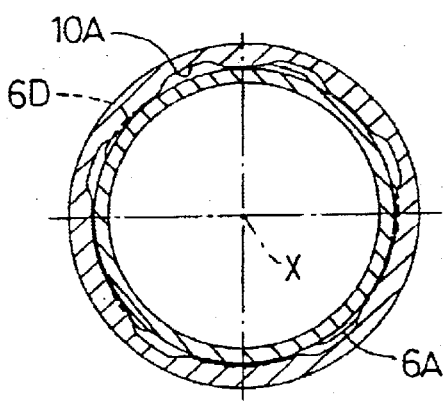
FIG. 10D is a front view in section showing a still further condition in which the two interconnected tubular members are shifted by 20 degrees from the shipment condition shown in FIG. 9.
Figure 10E:
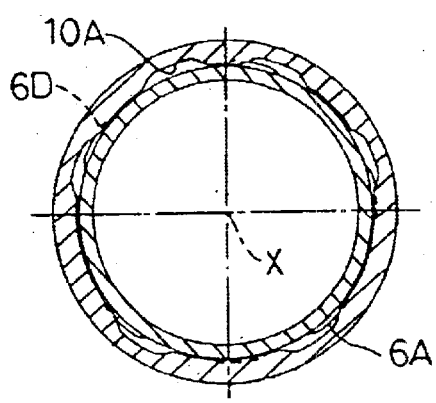
FIG. 10E is a front view in section showing a still further condition in which the two interconnected tubular members are shifted by 25 degrees from the shipment condition shown in FIG. 9.
Figure 10F:
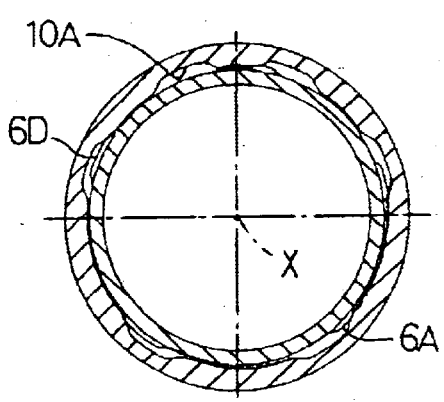
FIG. 10F is a front view in section showing a still further condition in which the two interconnected tubular members are shifted by 30 degrees from the shipment condition shown in FIG. 9.
Figure 11:
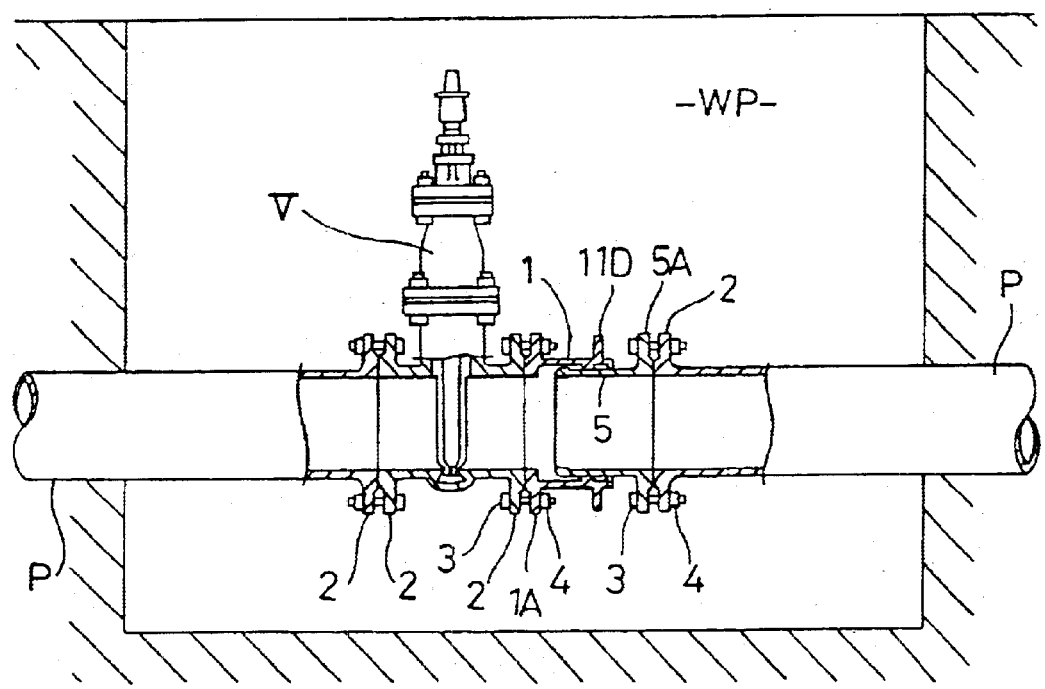
FIG. 11 is a partially cutaway side view in section illustrating an exemplary installment condition of the apparatus.

FIG. 10B shows a further condition in which the receiving tubular member 1 and the inserting tubular member 5 have been rotated by 10 degrees from the predetermined retained position shown in FIG. 9. FIGS. 10C–10F show still further conditions in which the tubular members 1 and 5 have been rotated by 20 degrees from the predetermined retained position of FIG. 9 by 15, 20, 25 and 30 degrees, respectively. In any one of these conditions, all or some of the projections 6A–6F of the inserting tubular member 5 are placed in abutment along the tube axial direction X against the retaining portion 1C of the receiving tubular member 1, thereby to firmly and reliably prevent withdrawal displacement between the two tubular members 1, 5.

With the above construction, when the receiving tubular member 1 and the inserting tubular member 5 are to be connected with each other, the predetermined phase relationship where the projections 6A–6F of the inserting tubular member 5 together forming the stopper portion 6 and the detaching recesses 10A–10F of the receiving tubular member 1 together forming the retaining portion are in agreement is realized only one time during the total rotation (360 degrees).

Therefore, the two tubular members 1, 5 can be rotated by the maximum angle of rotation of 180 degrees from the predetermined phase condition (i.e., the connecting position) where the projections 6A–6F of the inserting tubular member 5 and the detaching recesses 10A–10F of the receiving tubular member 1 are in peripheral alignment with each other to the predetermined retained position. Hence, when the receiving tubular member 1 or the inserting tubular member 5 is to be flange-connected with the fluid transport device such as the sluice valve V, fluid transport pipe P or the like by releasing the temporary fixing means 11 and the receiving tubular member 1 and the inserting tubular member 5 are to be slightly rotated relative to each other for mutual alignment, it is possible to ensure sufficient peripheral engagement depth between the retaining portion 1C of the receiving tubular member 1 and the projections 6A–6F of the inserting tubular member 5. Consequently, the two tubular members 1, 5 may be connected reliably and firmly while effectively preventing inadvertent withdrawal of one from the other.

Yet, as the projections 6A–6F and the detaching recesses 10A–10F are formed in symmetry with each other relative to the diametrical center line Y extending through the common axis X of the tubular members, it is easy for a user to visually find the predetermined phase relationship where the projections 6A–6F and the detaching recesses 10A–10F are in agreement. So that, the phase adjustment between the inserting tubular member 5 and the receiving tubular member 1 may be effected easily.

The temporary fixing means 11, as shown in FIG. 1, includes threaded holes 11A defined at two positions in the connecting flange 5A of the inserting tubular member 5, connecting portions 11D integrally formed at two peripheral positions in the outer peripheral face of the receiving tubular member 1 adjacent the receiver opening thereof, and two connecting bolts 11B interconnecting the threaded holes 11A and the connecting portions 11D.

More particularly, in the connecting flange 5A, the threaded holes 11A are defined at two positions in the middle between the bolt holes 12 and opposing to each other across the tube axis X. Further, the connection portions 11D define engaging recesses 11C peripherally engageable With the respective connection bolts 11B fixedly threaded into the screw holes 11A. Still further, on each of the connection bolts 11B, threaded a pair of clamping nuts 11E for fixedly clamping the connection portion 11D therebetween along the tube axial direction X and a lock nut 11F to be pressed against the connection flange 5A of the inserting tubular member 5.

Further, on the outer peripheral face of the receiving tubular member 1 and between the end face thereof on the receiver opening side and the connecting portion 11D, there is provided an attaching portion 1a made of a synthetic film or in the form of a tubular rubber element, as an example of a 'covering means' having light-shielding, water-resistance and gas impermeable properties for covering the detaching recesses 10A–10F from the above. And, the inserting tubular member 5 includes, on its inner peripheral face and at portions corresponding to the projections 6A–6F formed on the outer peripheral face thereof, a plurality of projections 1b which project radially inward.

Figure 12:
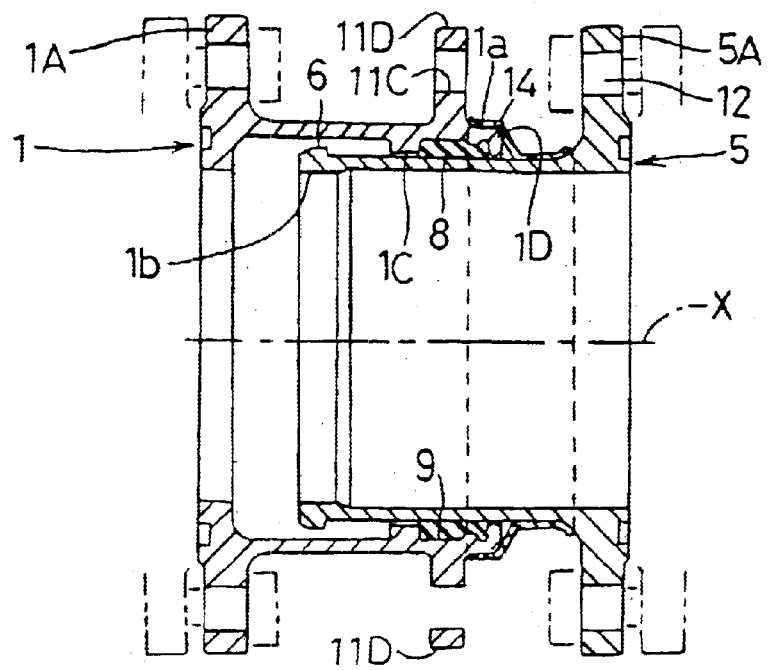
FIG. 12 is a side view in section showing a second embodiment of the flexible fluid-transport pipe joint apparatus relating to the present invention.
Figure 13:
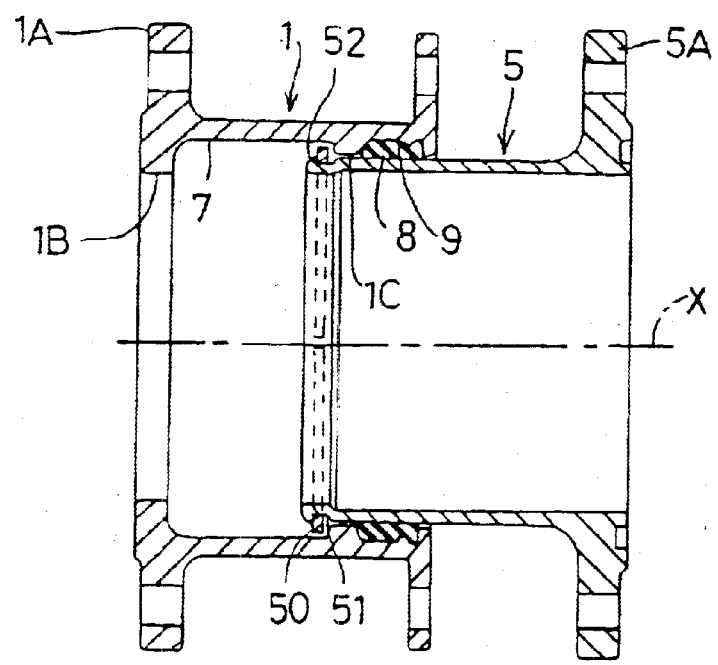
FIG. 13 is a side view in section showing a conventional flexible fluid-transport pipe joint apparatus.
Figure 14:
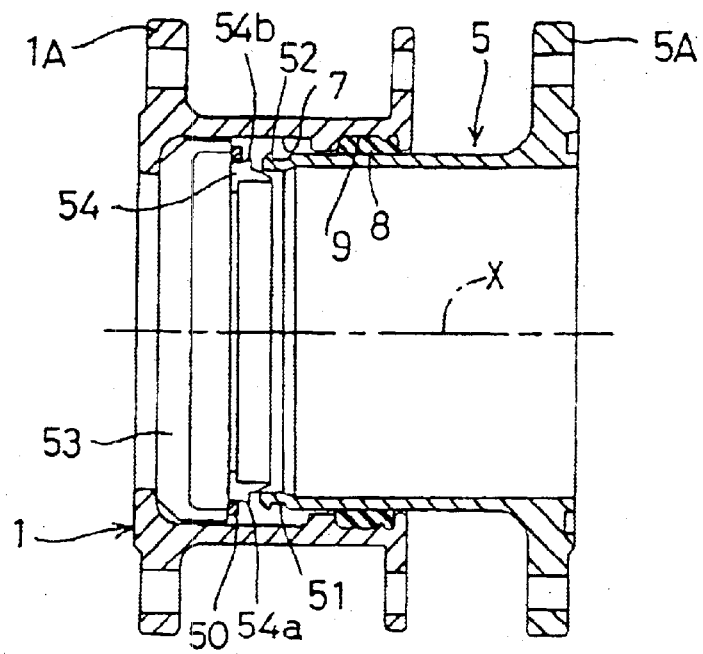
FIG. 14 is a side view in section showing a retaining ring (lock ring) prior to its attachment.
Figure 15:
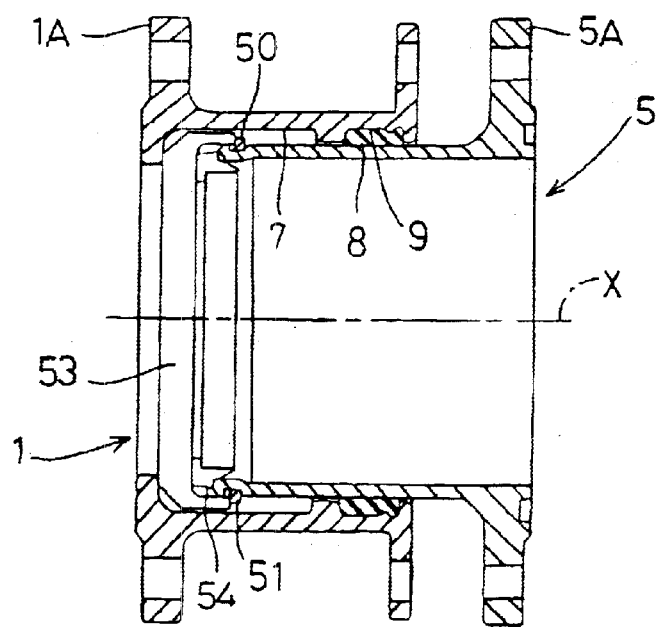
FIG. 15 is a side view in section showing the retaining ring after its attachment.

Next, a second embodiment of the invention will be described with reference to FIG. 12. This embodiment comprises another embodiment of the covering means for covering the detaching recesses 10A–10F. In this embodiment, the covering means comprises a heat-shrinkable synthetic resin film 14 shrunk-fitted on and extending over and across a connecting portion between the attaching portion 1a on the outer peripheral face of the receiving tubular member 1 and the outer peripheral face of the inserting tubular member 5.

The rest of the construction of this embodiment is identical to the first embodiment and therefore will not be described with like components being denoted with like numerals and marks in the figure.

Next, a third embodiment of the invention will be described.

In the first embodiment, the detaching recesses 10A–10F for allowing selective passage of the respective projections 6A–6F of the inserting tubular member 1 along the tube axial direction X are formed with the identical phase relationship in the respective annular circular wall portions 1C, 1D of the receiving tubular member 1. Instead, the flexible pipe joint apparatus of the invention may be constructed such that the detaching recesses 10A–10F of the one wall portion 1C and the detaching recesses 10A–10F of the other wall portion 1D are different from each other for allowing the respective projections 6A–6F of the inserting tubular member 4 to be rotated within a limited angular range between these two wall portions 1C, 1D.

The rest of the construction of this embodiment is identical to the first embodiment.

Still further embodiments of the invention will be described next

In the first embodiment, the relative slidable range between the two tubular members 1, 5 along the tube axial direction X is limited by causing both the stopper portion 6 of the inserting tubular member 5 and the leading end face of the inserting tubular member 5 to selectively come into abutment in the tube axial direction X against the annular circular wall portion 1B on the base end side and the annular circular wall portion 1C on the receiving opening side of together defining the first annular groove 7 therebetween. For realizing such limitation of the relative slidable range between the two tubular members 1, 5 along the tube axial direction X, this is also possible by causing the stopper portion 6 alone to come into abutment against the base-end side annular circular wall portion 1B and the receiver-opening side annular circular wall portion 1C defining the first annular groove 7 therebetween.

That is to say, what is essential in the present invention is that the abutment between the stopper portion 6 of the inserting tubular member 5 and the retaining portion 1C of the receiving tubular member 1 prevent the relative slidable displacement between the two tubular members 1, 5 along the tube axial direction at least on the withdrawing side in the predetermined relative slidable range.

In the first embodiment, the total six projections 6A–6F are formed on the inserting tubular member 5 and likewise the total six detaching recesses 10A–10F are formed in the receiving tubular member 1. However, the number, disposing pitch and specific dimensions, etc., of these projections and recesses are not particularly limited to the illustrated example, but may vary as suited.

Further, the specific construction of the temporary fixing means 11 provided in the flexible pipe joint apparatus of the invention is not limited to the one specifically described above, but may be modified in any way as long as such alternative construction can temporarily fix the two tubular members 1, 5 at least against relative rotational displacement thereof when these tubular members 1, 5 are interconnected in the predetermined phase condition and then rotated by a predetermined angle therefrom into the retained condition.

The above-described essential features of the present invention can be embodied in a different type of flexible pipe joint apparatus including a receiving tubular member 1 and an inserting tubular member 5 flexibly engaged and connected with each other, to each of which there is engaged and connected a connecting cylinder flexible along a partially spherical engaging face.

The present invention may be embodied in any other manner than the above-described or illustrated specific embodiments. The construction of the invention may be modified by those skilled in the art in many ways without departing from the essential spirit thereof which is defined only by the claims. Such modified constructions too are construed to be encompassed within the scope of the invention.

What is claimed is:

1. A flexible fluid-transport pipe joint apparatus including a receiving tubular member, an inserting tubular member insertable into and connectable with the receiving tubular member along a tube axial direction, the apparatus comprising:

a stopper portion formed in an outer peripheral face of the inserting tubular member, the stopper portion projecting radially outward from the outer peripheral face;

a retaining portion formed in an inner peripheral face of the receiving tubular member, the retaining portion coming into contact with the stopper portion of the inserting tubular member along the tube axial direction so as to prevent slidable displacement between the two tubular members at least on a withdrawal side in a predetermined relative slidable range of the tubular members along the tube axial direction;

wherein the stopper portion includes a plurality of projections formed at a plurality of positions along a periphery of the inserting tubular member;

wherein the retaining portion of the receiving tubular member includes a plurality of detaching recesses, each said recess allowing passage of each of the projections axially relative to the detaching recess only when the receiving tubular member and the inserting tubular member are located in a predetermined phase relationship with each other; and wherein temporary fixing means is provided for temporally fixing the receiving and inserting tubular members to be non-rotatable relative to each other when the tubular members are under a retained condition which is realized by rotating the inter-connected receiving and inserting tubular members relative to each other by a predetermined angle from said predetermined phase relationship, said temporary fixing means being detachably attached to a connecting flange of the inserting tubular member and also to a plurality of projecting connecting portions formed at a plurality of peripheral positions in the outer peripheral face of the receiving tubular member adjacent a receiver opening thereof;

wherein engaging recesses are defined in said connecting portions peripherally engageable with connecting bolts fixed to said connecting flange; and covering means extending externally between the outer peripheral face of the receiving tubular member and the outer peripheral face of the inserting tubular member so as to cover the detaching recesses, wherein said covering means is comprised of a flexible shield for shielding the detaching recesses from light, water and gas.

2. The pipe joint apparatus as defined in claim 1, further comprising an attaching portion for the covering means formed in the outer peripheral face of the receiving tubular member and between an end face of the receiving tubular member adjacent the receiver opening thereof and said connecting portions.

3. The pipe joint apparatus as defined in claim 1, wherein the plurality of projections and the plurality of detaching recesses are arranged in symmetry with respect to a diametrical center line extending through the common axis of the tubular members and the plurality of detaching recesses are peripherally distributed such that the peripherally adjacent pairs of the detaching recesses form center angles relative to the tube axis which angles are different from one another.

4. The pipe joint apparatus as defined in claim 1, wherein the inserting tubular member includes, on an inner peripheral face and at portions corresponding to the projections formed on the outer peripheral face thereof, a plurality of projections which project radially inward.

5. The pipe joint apparatus as defined in claim 1, wherein the flexible shield is comprised of a tubular synthetic film.

6. The pipe joint apparatus as defined in claim 1, wherein the flexible shield is comprised of a tubular rubber element.

7. The pipe joint apparatus as defined in claim 1, further including an elastic seal within a gap between the inner peripheral face of the receiving tubular member and the outer peripheral face of the inserting tubular member.

* * * * *

UNITED STATES PATENT AND TRADEMARK OFFICE
CERTIFICATE OF CORRECTION

PATENT NO.    : 6,659,511 B2
DATED         : December 9, 2003
INVENTOR(S)   : Hideki Yoneyama et al.

It is certified that error appears in the above-identified patent and that said Letters Patent is hereby corrected as shown below:

Column 5,
Line 8, "relationship. So that, the" should read -- relationship so that the --.
Line 42, "axial gab" should read -- axial gap --.

Column 9,
Line 16, "engageable With" should read -- engageable with --.

Column 11,
Lines 19-20, "temporally" should read -- temporarily --.

Signed and Sealed this

Fifteenth Day of June, 2004

JON W. DUDAS
*Acting Director of the United States Patent and Trademark Office*